Patented July 13, 1926.

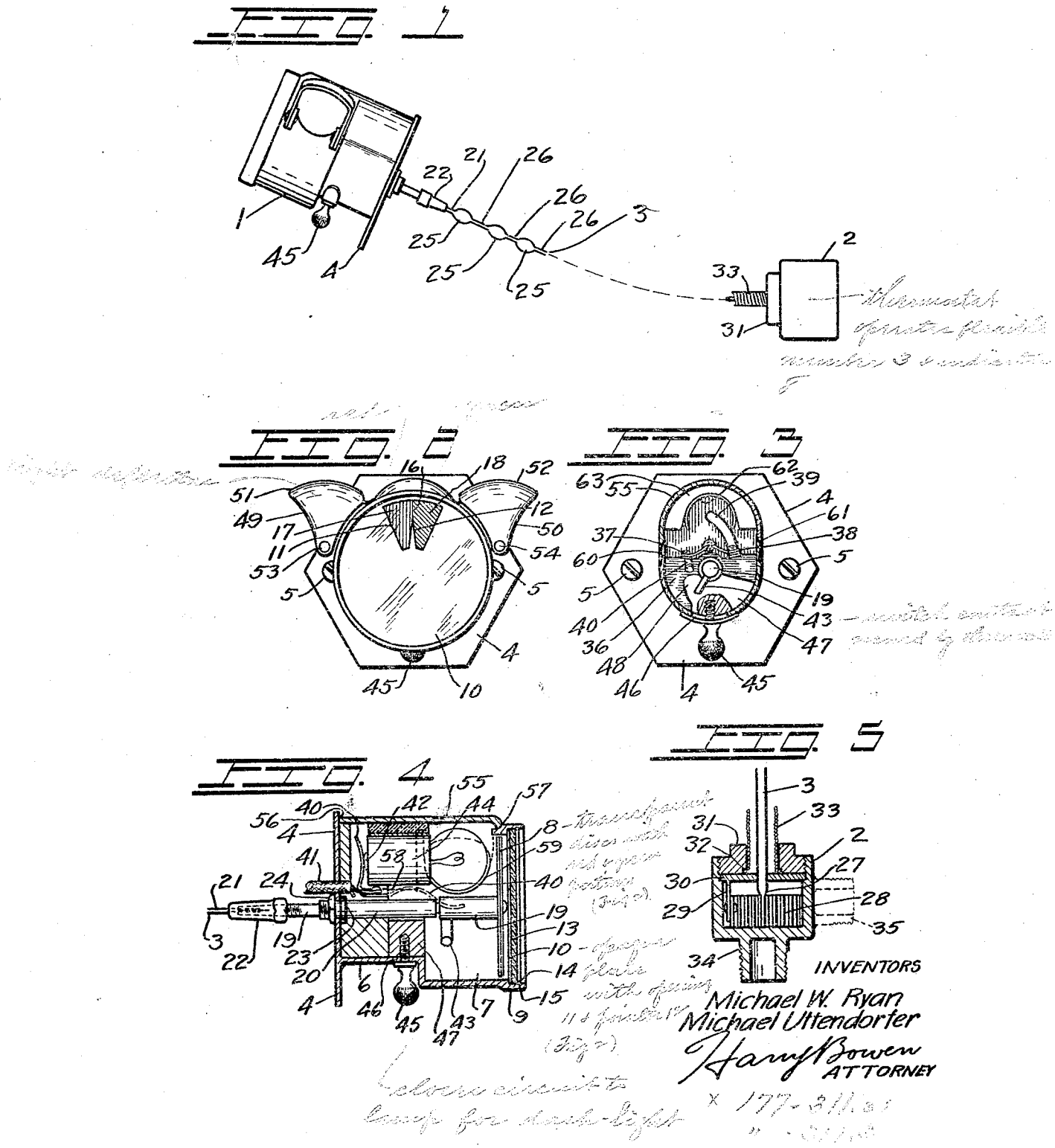

1,592,227

UNITED STATES PATENT OFFICE.

MICHAEL W. RYAN AND MICHAEL UTTENDORFER, OF SEATTLE, WASHINGTON.

TEMPERATURE INDICATOR AND DASH LIGHT.

Application filed June 11, 1924. Serial No. 719,364.

The invention is a simple and efficient device for indicating the temperature of the engine or of water in the engine of a motor vehicle which may be placed upon the instrument board and which is provided with a light with means for automatically lighting it as the temperature reaches a predetermined degree.

The invention is an improvement over our prior Patent No. 1,422,378, issued July 11, 1922, and also over our application for improvements in the prior patent which was filed August 3, 1922, with the Serial No. 579,339, in that a lamp is embodied in the indicating device and provided with an automatic switch which will light the lamp as the temperature reaches a predetermined degree.

The object of the invention is to provide an indicating device with a lamp in it.

Another object of the invention is to provide a temperature indicating device with a lamp and an automatic means for lighting the lamp as the temperature reaches a predetermined degree.

And a further object of the invention is to provide a temperature indicating device with a lamp that may also be used as a dash-lamp.

With these ends in view the invention embodies an indicating device having a casing with an opening in its face through which colored discs may be seen and the placing of a lamp behind the discs which is provided with a manually operated switch and also an automatic switch, said discs being connected to a thermostatic element in a plug that may be placed in or attached to the engine or radiator casing, and said indicator casing having openings in the sides which will permit light rays to pass over the instrument board.

Other features and advantages of the invention will be seen from the following description taken in connection with the drawings, wherein:—

Figure 1 is a side view showing the indicating device and also the plug.

Figure 2 is a front view of the indicating device.

Figure 3 is a cross section through the indicating device at a point just behind the lamp section.

Figure 4 is a longitudinal section through the center of the indicating device.

Figure 5 is a cross section through the center of the plug.

In the drawings we have shown our device as it would be constructed wherein numeral 1 indicates the indicating device, numeral 2 the plug, and numeral 3 the flexible shaft that may connect the indicating device to the plug.

The casing 1 may be constructed upon a flat base 4 which may be held to the instrument board by screws 5 or in any suitable manner and may be provided with a small section 6 in which the switches will be located and a larger section 7 in which the lamp will be located. The indicating discs, which we have indicated by the numeral 8, will be placed in a circular section 9 at the face of the indicating device and in this section is also a plate 10 which has an opening 11 in it and a pointer 12 in the opening, and also a glass 13, both of which are held by a spring wire 14 in a groove 15. It is understood that the opening 11 and the plate 10 may be of any suitable shape or size and may have a pointer of any suitable type in it. The indicating discs 8 may be divided by a line 16, shown in Figure 2, and the transparent material on each side of the line may be of different colors. The colors indicated are red and green, the red being on the left hand side of the pointer 12 as indicated by the section lining 17, and green on the opposite side as indicated by the section lining 18, in Figure 2. These discs are supported on a shaft 19 which is rotatably held in a sleeve 20 and the outer end of the shaft is clamped to a flexible cable as indicated by the numeral 21 by a clamp 22. The sleeve 20 is provided with a collar 23 which bears against the inner surface of the base 4 and is rigidly held by a nut 25 on the outer end.

The end 21 of the flexible cable 3 may be round or similar to wire and this wire may be flattened in sections with each succeeding section perpendicular to the preceding section as shown in Figure 1; or the sections indicated by the numeral 25 flattened vertically, and the intermediate sections indicated by the numeral 26 flattened horizontally. This will make an unusually flexible cable as the vertical sections will bend when the curvature is lateral and the horizontal sections will bend when the curvature is upward or downward. The opposite end of the cable 3 is flattened as shown at the point 27 and connected to a thermostatic element 28 in the form of a coil or watch spring in the plug 2. The opposite end of the element 28 is connected to a projection 29 on a washer 30 which is rigidly held in the plug 2 by a nut 31, and the nut 31 is provided with a recess 32 in which a flexible tube 33 may be held to cover the cable 3. The plug may be provided with a threaded shank 34 which may extend from one end as shown in full lines in Figure 5, or from the side as indicated in dotted lines in Figure 5.

The switch section 6 of the casing 1 may be provided with a fibre block 36 to which terminals 37 and 38 may be attached and from these terminals contact points 39 and 40 may extend to engage suitable means for completing a circuit through them. A double wire circuit may be connected to the terminals 37 and 38 by a cord 41 which will extend to the rear of the base 4 as shown in Figure 4, and the terminal 38 may be arranged so that its contact point 39 will engage the contact point at the rear of a lamp socket as shown in Figure 4 and indicated by the numeral 42. The opposite terminal 37 may be arranged so that its contact point 40 will extend outward so that it may be engaged by a projection 43 on the rod 19 and also arranged so that as the projection pushes it upward it will engage the socket of the lamp which we have indicated by the numeral 44 and thereby complete the circuit. In Figure 4 we have indicated the contact point 37 in dash lines, although it is actually on the near side of the center, for the purpose of illustrating the manner in which the contact will be made as it will be observed that when the shaft 19 rotates in a clockwise direction the projection 43 will engage the end of the contact 40 and thereby raise the contact until it engages the socket 44 of the lamp.

It will also be observed that this contact may be made and the circuit completed by moving a knob 45 which is connected through a slotted hole 46 to a sliding member 47 on the interior of the casing, as when this knob is moved in a clockwise direction the point 48 will engage the contact point 40 and move it upward so that it will engage the socket 44 as hereinbefore described by the action of the projection 43. This will make it possible to light the light by hand after dark and it will still be possible to observe the indicator as the light will shine through the transparent discs 8. It will also be observed that the rays of light will pass out of the side openings 49 and 50 as shown in Figure 2 and thereby light the instrument board. These openings are provided with movable covers 51 and 52 which are hinged at the points 53 and 54 so that the rays of light may be thrown upward or downward as may be desired.

It will be understood that other changes may be made in the construction without departing from the spirit of the invention. One of which changes may be in the design of the casing 1; another may be in the design of the plug; and still another may be in the design of the switches or in the means for operating it.

The construction will be readily understood from the foregoing description. To use the device it may be installed in a car or the like with the casing 1 on the instrument board and the plug 2 in the side of the engine or in the radiator. It will be seen that the device will normally rest with the dividing line between the red and green on the disc on the center of the indicating point 12 and as the temperature of the engine exceeds a predetermined amount the discs will rotate in a counter-clockwise direction and the dividing line between the two colors will move beyond the indicator point. At the same time the projection 43 will also rotate and cause the lamp to light as hereinbefore described. It will therefore, be seen that the indicator will not only operate but attention will be called to the device as the engine becomes over-heated by the flashing of the lamp.

When it is desired to remove or replace the lamp a detachable section 55 of the casing 1 may be removed which will open the entire casing. This section 55 extends from the point 56 at the rear of the casing to a point 57 at the forward end and the sides extend downward to the dotted line 58 at the rear and to the light openings 59 at the forward end. This detachable section is held to the main section by springing ridges in the sides over projections on the upper sides of the lower section as shown at the points 60 and 61 in Figure 3. The lamp may then be removed from this section as it is held in a spring clip 62 which is insulated from the section by a section of insulation 63. It will therefore, be seen that the entire inner portion is easily accessible so that the lamp or switches may readily be replaced or repaired.

Having thus fully described the invention, what we claim as new and desire to secure by Letters Patent, is:—

In a combined vehicle dash lamp and indicator, a casing, openings in the front and sides of said casing, means for mounting said casing on the instrument board of a vehicle, a lamp, means mounting said lamp in said casing adjacent the openings, means adjacent said side opening for directing light from said lamp upon the instrument board, a circuit for said lamp, manually operable means for closing said circuit to permit use of said lamp as a dash lamp, a translucent indicator dial, means mounting said indicator dial for rotary movement between said lamp and said front opening, and means operated by a predetermined movement of said dial for closing said circuit.

MICHAEL W. RYAN.
MICHAEL UTTENDORFER.